United States Patent
Levi et al.

(10) Patent No.: US 12,218,961 B2
(45) Date of Patent: Feb. 4, 2025

(54) TECHNIQUES FOR SECURING COMPUTING INTERFACES

(71) Applicant: NONAME GATE LTD., Tel Aviv-Jaffa (IL)

(72) Inventors: Shay Levi, Tel Aviv (IL); Oz Golan, Ramat Gan (IL); Hila Zigman, Hod Hasharon (IL); Oren Shpigel, Tel Aviv (IL); Netanel Maman, Mazkeret Batia (IL); Yuval Alkalai Tavori, Ramat Gan (IL)

(73) Assignee: Noname Gate Ltd., Tel Aviv (IL)

( * ) Notice: Subject to any disclaimer, the term of this patent is extended or adjusted under 35 U.S.C. 154(b) by 477 days.

(21) Appl. No.: 17/154,764

(22) Filed: Jan. 21, 2021

(65) Prior Publication Data
US 2022/0232023 A1    Jul. 21, 2022

(51) Int. Cl.
*H04L 9/40* (2022.01)
*G06F 16/25* (2019.01)
(Continued)

(52) U.S. Cl.
CPC ........ *H04L 63/1425* (2013.01); *G06F 16/258* (2019.01); *H04L 41/0866* (2013.01);
(Continued)

(58) Field of Classification Search
None
See application file for complete search history.

(56) References Cited

U.S. PATENT DOCUMENTS

| | | | |
|---|---|---|---|
| 7,937,755 B1 * | 5/2011 | Guruswamy | H04L 63/1416 709/224 |
| 8,745,641 B1 | 6/2014 | Coker | |

(Continued)

FOREIGN PATENT DOCUMENTS

| | | |
|---|---|---|
| EP | 3427179 B1 | 8/2019 |
| JP | 2018518762 A | 7/2018 |

OTHER PUBLICATIONS

International Search Report and Written Opinion of International Searching Authority for PCT/IB2022/050443m ISA/IL, Jerusalem, Israel, Dated: Mar. 15, 2022.
(Continued)

*Primary Examiner* — Trang T Doan
(74) *Attorney, Agent, or Firm* — David H. Judson

(57) ABSTRACT

A system and method for identifying computing interface calls using communications protocols. A method includes extracting data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers; duplicating traffic for the communications session based on the extracted data, wherein duplicating the traffic further comprises converting the extracted data into a unified data modeling format; and identifying at least one computing interface call based on the duplicated traffic.

19 Claims, 7 Drawing Sheets

(51) Int. Cl.
*H04L 41/0866* (2022.01)
*H04L 43/16* (2022.01)
*H04L 67/14* (2022.01)

(52) U.S. Cl.
CPC .......... *H04L 43/16* (2013.01); *H04L 63/1416* (2013.01); *H04L 67/14* (2013.01)

(56) References Cited

U.S. PATENT DOCUMENTS

| | | |
|---|---|---|
| 8,931,101 B2 | 1/2015 | Baluda et al. |
| 9,853,996 B2 | 12/2017 | Eliyahu et al. |
| 9,973,484 B2 | 5/2018 | Reid et al. |
| 10,116,674 B2 | 10/2018 | Baradaran et al. |
| 10,270,788 B2 | 4/2019 | Faigon et al. |
| 10,372,702 B2 | 8/2019 | Harsha et al. |
| 10,681,012 B2 | 6/2020 | Subbarayan et al. |
| 10,817,592 B1* | 10/2020 | Bronson ............... H04L 63/101 |
| 11,283,824 B1* | 3/2022 | Berger ................ H04L 63/1416 |
| 11,438,247 B2* | 9/2022 | Wu ......................... H04L 43/20 |
| 2002/0009078 A1* | 1/2002 | Wilson ............... H04L 12/4666 370/386 |
| 2014/0201838 A1* | 7/2014 | Varsanyi ............... G06F 21/552 726/23 |
| 2015/0304184 A1* | 10/2015 | Ruddick ................ H04L 43/12 370/252 |
| 2018/0027006 A1 | 1/2018 | Zimmermann et al. |
| 2018/0324208 A1 | 11/2018 | Eliyahu et al. |
| 2019/0114417 A1 | 4/2019 | Subbarayan et al. |
| 2019/0147300 A1 | 5/2019 | Bathen et al. |
| 2020/0021607 A1* | 1/2020 | Muddu ................... H04L 43/00 |
| 2020/0067948 A1 | 2/2020 | Baradaran et al. |
| 2020/0274825 A1* | 8/2020 | Zhou ...................... H04L 43/08 |
| 2020/0389469 A1* | 12/2020 | Litichever ............... H04W 4/40 |
| 2022/0368703 A1* | 11/2022 | Jiang ...................... G06N 20/00 |
| 2023/0045247 A1* | 2/2023 | Talur .................. H04L 43/0823 |

OTHER PUBLICATIONS

"Azure Machine Learning Anomaly Detection API—Team Data Science Process", Microsoft Docs, 2021.
Search Report and Written Opinion for application No. 11202202477S, dated Mar. 12, 2024. Intellectual Property Office of Singapore, Paya Lebar Quarter, Singapore.

\* cited by examiner

TECHNIQUES FOR SECURING COMPUTING INTERFACES

TECHNICAL FIELD

The present disclosure relates generally to cybersecurity for computing interfaces, and more specifically to detecting anomalous behavior based on use of computing interfaces.

BACKGROUND

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components.

In modern computing architectures, the backend acts like a direct proxy for data. As a result, a flawed API can lead to exposure of sensitive data, account takeovers, and even denial of service (DOS) attacks. As a result, securing APIs is a top priority of many computing services providers.

Some existing solutions for detecting API abuse have been created. These solutions typically look at communications between a computing architecture and one or more external systems through an API to detect abnormal traffic. These solutions face challenges in adapting to new and constantly evolving threats. Techniques for improving accuracy of abnormality detection and more flexibly adapting to threats are always desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying computing interface calls using communications protocols. The method comprises: extracting data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers; duplicating traffic for the communications session based on the extracted data, wherein duplicating the traffic further comprises converting the extracted data into a unified data modeling format; and identifying at least one computing interface call based on the duplicated traffic.

Certain embodiments disclosed herein also include a non-transitory computer readable medium having stored thereon causing a processing circuitry to execute a process, the process comprising: extracting data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers; duplicating traffic for the communications session based on the extracted data, wherein duplicating the traffic further comprises converting the extracted data into a unified data modeling format; and identifying at least one computing interface call based on the duplicated traffic.

Certain embodiments disclosed herein also include a system for identifying computing interface calls using communications protocols. The system comprises: a processing circuitry; and a memory, the memory containing instructions that, when executed by the processing circuitry, configure the system to: extract data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers; duplicate traffic for the communications session based on the extracted data, wherein duplicating the traffic further comprises converting the extracted data into a unified data modeling format; and identify at least one computing interface call based on the duplicated traffic.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
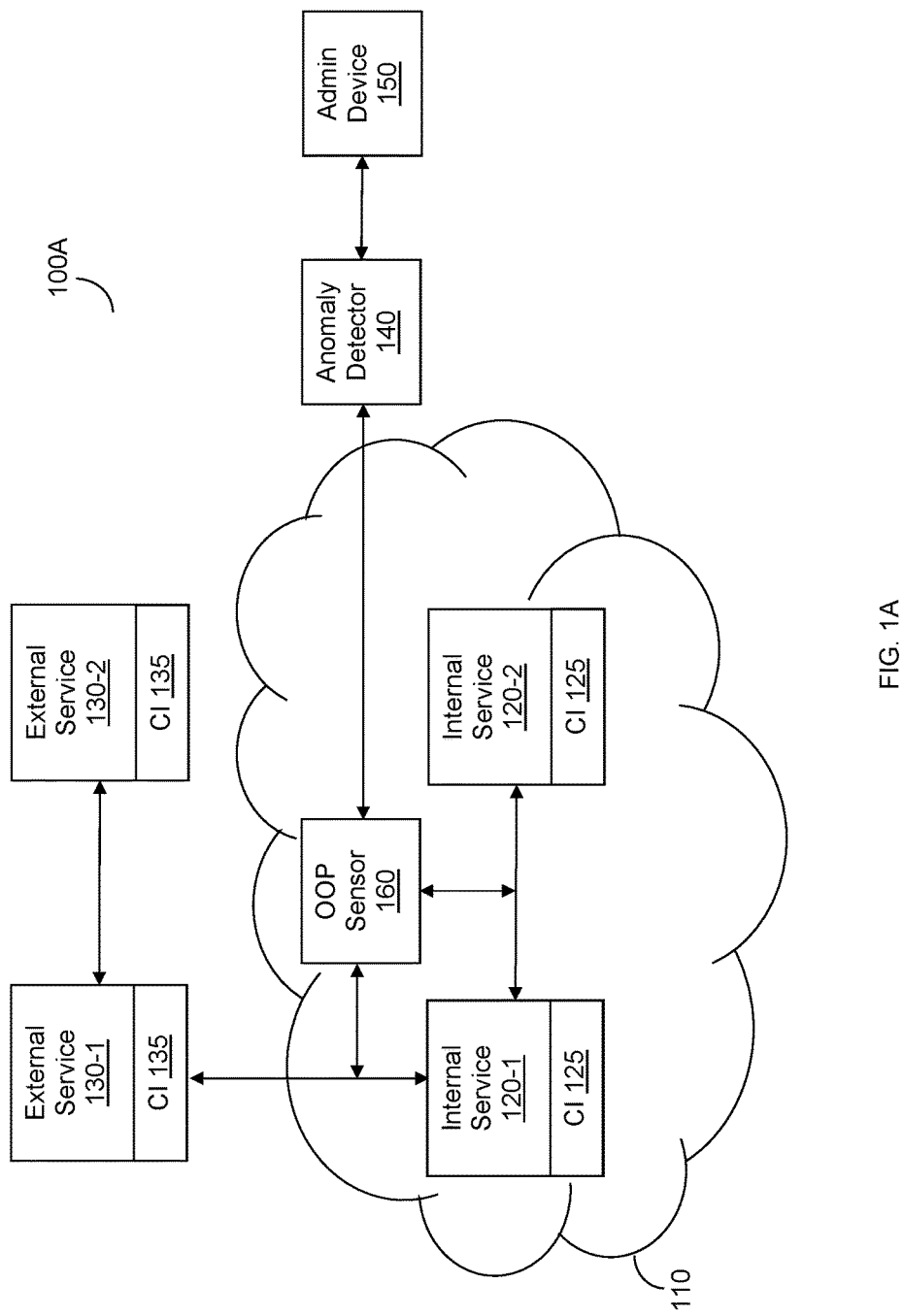
FIGS. 1A-1C are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting anomalies based on use of computing interfaces. The disclosed embodiments can be utilized to detect anomalous communications via communication channels such as, but not limited to, Application Programming Interfaces (APIs).

In an embodiment, traffic related to communications between computing interfaces is duplicated. Duplicating the traffic includes extracting data from each layer used for the communications, where at least a portion of the data extracted from one layer may be utilized to build a higher layer. The data extracted from each layer may include, but is not limited to, data utilized for building a higher layer, metadata utilized for subsequent processing and analysis, both, and the like. In a further embodiment, the data extracted from each layer excludes any protocol-specific data.

Duplicating the traffic further includes building each layer above the lowest layer based on data extracted from lower layers. In some embodiments, duplicating the traffic may further include performing a full session reconstruction in order to reconstruct a communications session such that it includes all request-response pairs of the communications session. The extracted data may be utilized to duplicate the traffic in a unified data modeling format which is protocol-agnostic, i.e., such that the duplicated traffic does not include any protocol-specific data and the subsequent analysis is not affected by the type of protocol used for the communications.

In a further embodiment, the duplicated traffic is analyzed. The analysis may be performed using a machine learning model trained based on training computing interface communication data. Based on the analysis, one or more anomalous behaviors are identified, and supplemental data may be generated. The identified anomalous behaviors and any generated supplemental data may be provided for subsequent use, for example, via a user interface such as a dashboard.

In this regard, it has been identified that, although some existing solutions utilizing traffic mirroring exist, but these solutions are limited in their ability to duplicate various types of traffic. In particular, some existing solutions for duplicating traffic related to APIs that an organization exposes to external services and systems. However, these solutions cannot effectively duplicate intra-organization traffic (i.e., traffic used by computing interfaces or traffic between computing interfaces of services the organization consumers (i.e., services which are external to a network environment of the organization).

Some cloud and other computing service providers currently provide data about communications between endpoints within a given network such that there is a wealth of data available. However, this data is often incomplete and therefore cannot be effectively utilized to detect anomalies based on API communications as originally created. To this end, it has been identified that performing packet mirroring by reconstructing traffic can be used to generate more complete interface communications data and, therefore, more accurately detect anomalies in communications via computing interfaces. Further, by providing full reconstructions of traffic, the disclosed embodiments can be utilized to allow for enforcement of policies with respect to computing interface communications with more options than existing solutions.

It has also been identified that data transmitted between computing interfaces such as APIs have the property that some portions of data are correlated among different requests and responses such that those two portions of data which appear in the same request or response tend to be repeated throughout sessions and among different sessions such that those two portions of data tend to appear in subsequent requests and responses. Accordingly, the disclosed embodiments include techniques for learning such correlations that can therefore utilize this property in order to reconstruct traffic, thereby allowing for more accurately duplicating traffic. Moreover, the disclosed embodiments may utilize miscorrelations (e.g., a mismatch between a learned correlation and the actual fields of a request or response) in order to identify anomalies in computing interface communications.

The disclosed embodiments provide techniques for traffic duplication which can duplicate various types of traffic such as intra-organization traffic, traffic between external computing interfaces, and traffic related to computing interfaces exposed by an organization to external services and systems. The disclosed embodiments can leverage network traffic data that may be provided by cloud providers or other network operators in order to duplicate the various types of traffic without requiring intercepting the traffic or otherwise interfering with normal or otherwise baseline communications. More specifically, the disclosed embodiments provide techniques allowing for reconstructing such traffic based on computing interface data.

By allowing for analysis of all of these kinds of traffic, the disclosed embodiments can effectively access more data, thereby permitting for identifying more anomalies than existing solutions and increasing the overall accuracy of anomaly detection. Moreover, correlations among computing interface data duplicated in accordance with the disclosed embodiments may be learned by using features derived from such computing interface data as inputs to a machine learning algorithm, thereby further improving anomaly detection. Additionally, the disclosed embodiments allow for collecting the full request and response for each anomaly even for communications whose data is only partially accessible. This data can be provided to administrators or users to give them a better overall picture of the computing interface anomalies than existing solutions allow for.

Moreover, since the disclosed embodiments provide techniques for duplicating traffic in a protocol-agnostic manner, the disclosed embodiments allow for accurately generating insights or detecting anomalies regardless of the type of protocol used for communications.

Figure 1B:
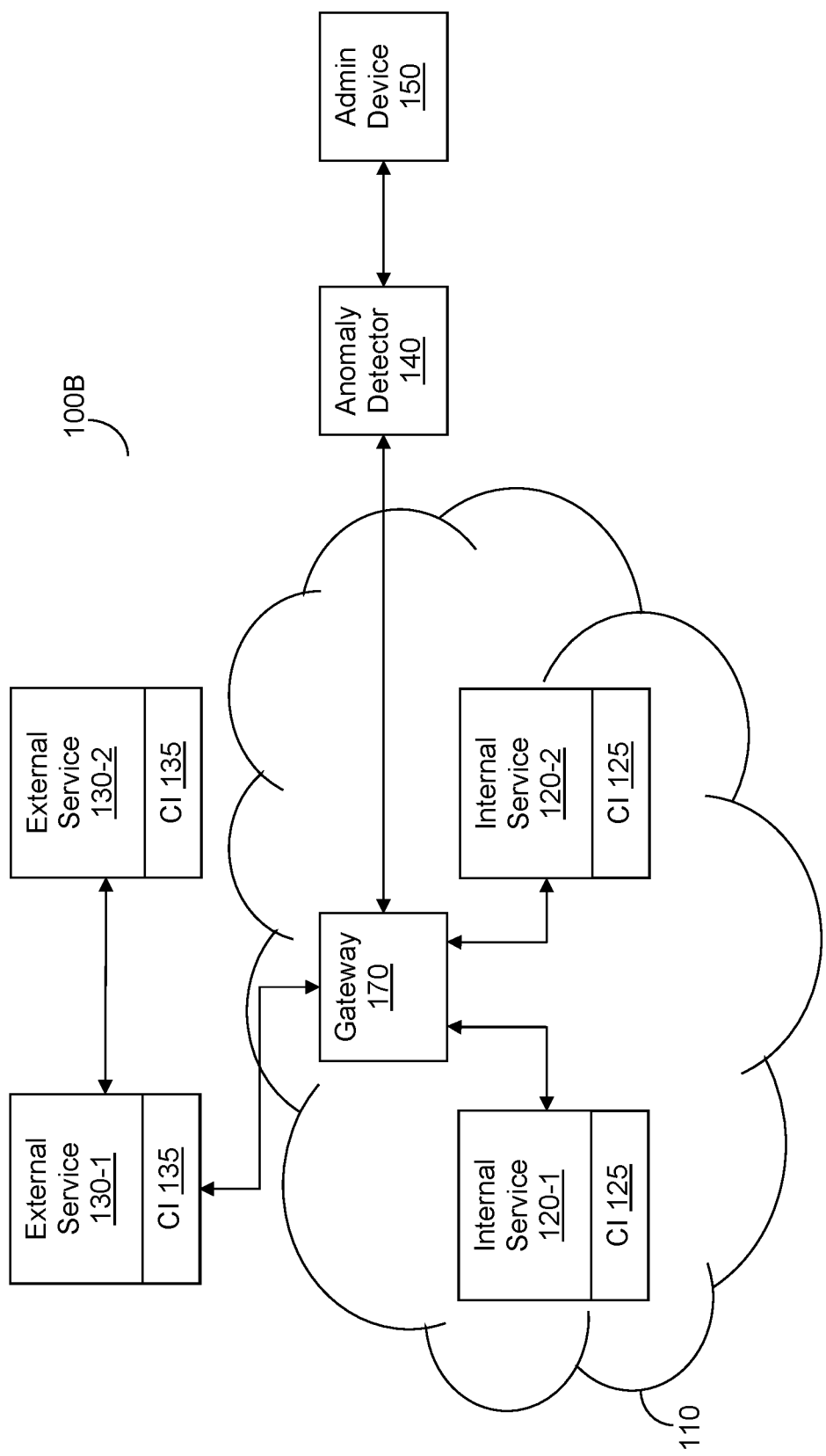
Figure 1C:
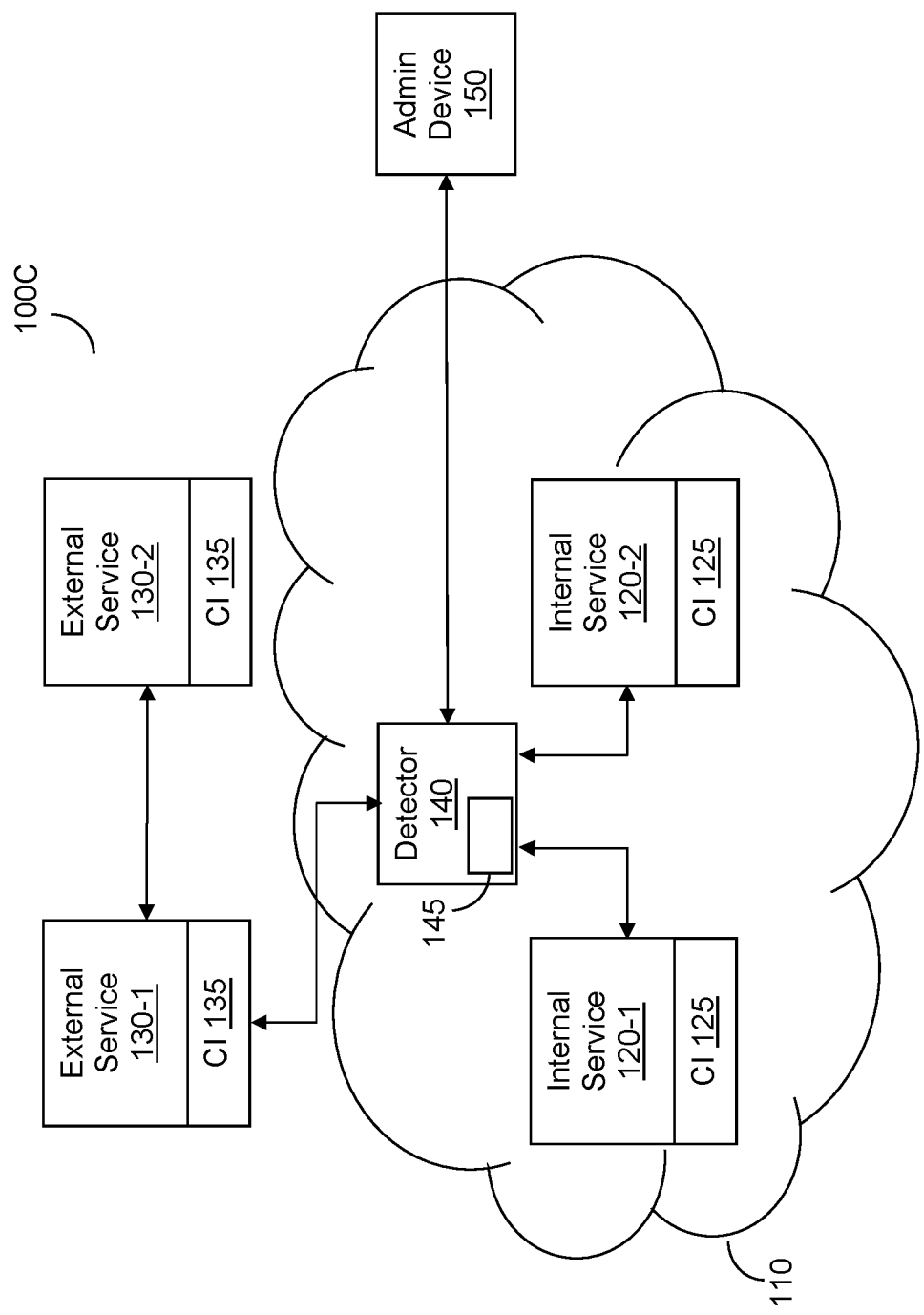

FIGS. 1A-C show example network diagrams 100A-C utilized to describe the various disclosed embodiments. In each of FIGS. 1A-C, internal services 120-1 and 120-2 (which may be referred to individually as an internal service 120 or collectively as internal services 120) communicate with each other and/or with external services 130-1 and 130-2 (which may be referred to individually as an external service 130 or collectively as external services 130). The internal services 120-1 and 120-2 are services hosted on a network 110. Each of the internal services 120 communicates at least using a respective communications interface (CI) 125 and each of the external services 130 communicates at least using a respective communications interface (CI) 135. The communication interfaces 125 and 135 may be, but are not limited to, Application Programming Interfaces (APIs).

The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be operated by an organization (e.g., by including servers owned by the organization), or may be operated by another entity (e.g., a cloud provider or other provider of network computing services). It should be noted that a single network 110 is depicted merely for simplicity purposes, but that the internal services 120 may communicate via multiple networks and/or other connections in accordance with the disclosed embodiments.

FIG. 1A depicts an out of band implementation. In FIG. 1A, an out of path (OOP) sensor 160 is deployed out of path of the communicating services 120 and 130. The out of path sensor 160 is configured to duplicate traffic between the computing interfaces 125 and/or 135, and to send the duplicated traffic to the anomaly detector 140 for analysis.

FIG. 1B depicts a gateway plugin implementation. In FIG. 1B, a gateway 170 is deployed in line between the internal services 120 and between the internal service 120-1 and the external services 130-1. The gateway 170 is configured to receive requests and responses from any of the services 120 and/or 130, and to forward those requests and responses to appropriate destinations. The gateway 170 may be further configured to enforce one or more policies with respect to traffic. In the example implementation shown in FIG. 1B, the gateway 170 is configured to send a copy of each request and response to the anomaly detector 140 for analysis. When the traffic between the computing interfaces 125 and/or 135 is encrypted, the gateway 170 may be further configured to decrypt the traffic data before transmitting such data to the anomaly detector 140.

The gateway 170 may be, but is not limited to, an API gateway. In this regard, it is noted that many cloud providers and other network service providers have existing gateways deployed therein for managing traffic. Accordingly, the disclosed embodiments may utilize existing functionality of such gateways in order to obtain response-request data which can be utilized as described herein.

FIG. 1C depicts an inline implementation. In FIG. 1C, the anomaly detector 140 is deployed in line between the internal services 120 and between the internal service 120-1 and the external services 130-1. The anomaly detector 140 is configured to analyze requests and responses as described herein in order to detect anomalies in computing interface data and generate supplemental data. To this end, the anomaly detector 140 may include a sensor module 145 configured to duplicate traffic as described herein. The anomaly detector 140 may be further configured to act as a gateway by forwarding requests and responses to appropriate destinations, decrypting traffic, or both.

The anomaly detector 140 is configured to detect anomalies and/or generate supplemental data as described herein, and may be configured to send data indicating the detected anomalies and/or the supplemental data to the admin device 150 for display.

The admin device 150 may be, but is not limited to, a personal computer, a laptop, a tablet computer, a smartphone, a wearable computing device, or any other device capable of receiving and displaying notifications or a graphical user interface including anomaly detection data and/or supplemental data. The admin device 150 may be, but is not limited to, operated by an administrator of the network 110 or other user who may want information regarding computing interface activity and, in particular, anomalous computing interface activity. In another implementation (not shown in any of FIGS. 1A-C), the anomaly detector 140 may be configured to send such data to a cybersecurity tool configured to perform mitigation actions with respect to the internal services 120 and/or the external services 130.

It should be noted that the particular network configurations shown in FIGS. 1A-C are merely utilized to illustrate various example deployments of the anomaly detector 140 and that the disclosed embodiments may be applied to other network configurations without departing from the scope of the disclosure. As some particular examples, different numbers of internal services 120, external services 130, or both, may communicate amongst each other, and the anomaly detector 140 may be deployed such that it can identify anomalies in any or all such communications. In such implementations, multiple anomaly detectors may be utilized. Additionally, the anomaly detector 140 may be implemented as a system (e.g., a server), as a virtual machine, as a software container or other self-contained software package, and the like.

It should also be noted that the anomaly detector 140 is depicted as outside of the organization's network 110 in FIGS. 1A-B merely for simplicity purposes, and that the particular location of deployment of the anomaly detector 140 may vary in at least some implementations. As non-limiting examples, the anomaly detector 140 may be realized as a software-as-a-service (SaaS) managed in a separate cloud environment from the network 110, via accessing a shared cloud account that is also accessible to systems of the network 110, or on premises (e.g., in the network 110 or otherwise in physical or network proximity to the services 120), and the like.

Figure 2:
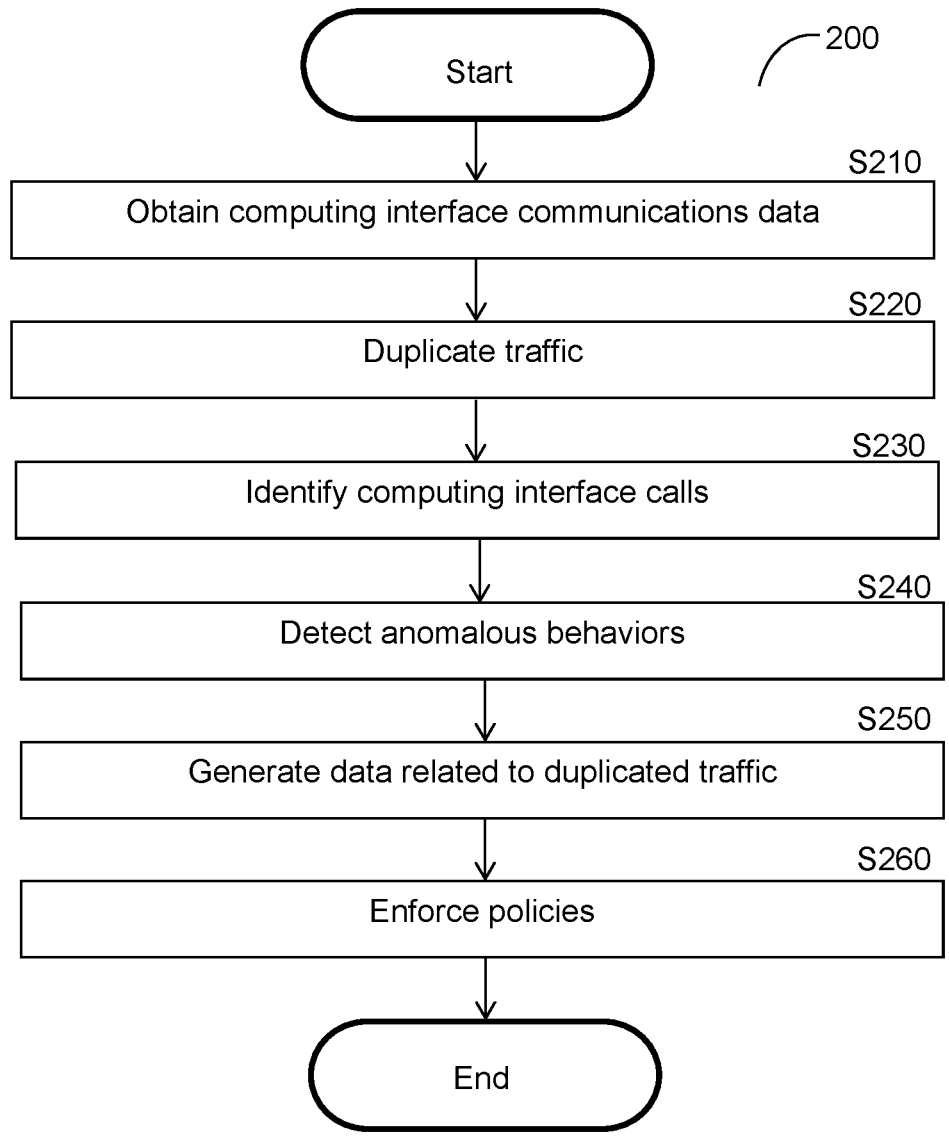
FIG. 2 is a flowchart illustrating a method for detecting anomalies based on use of computing interfaces according to an embodiment.

FIG. 2 is an example flowchart 200 illustrating a method for detecting anomalies based on use of computing interfaces according to an embodiment. In an embodiment, the method is performed by the anomaly detector 140.

At S210, computing interface communications data is obtained. The communications data includes data related to requests, responses, or both, sent between two endpoints via computing interfaces (e.g., the interfaces 120, the interfaces 130, or between an interface 120 and an interface 130) during a communication session. The communications data may be received (e.g., from a gateway or sensor deployed in a network where at least some of the services operate), may be intercepted (e.g., when the system performing the method of FIG. 2 is deployed in line or out of path between the computing interfaces and is capable of accessing communications data transmitted between such computing interfaces), and the like.

At S220, traffic is duplicated based on the computing interface communications data. In an embodiment, S220 includes creating a full session reconstruction based on computing interface communications data which only provides partial data related to the session. To this end, the full session reconstruction may include each request-response pair of the session (i.e., each session and the next response sent after each respective session).

Figure 3:
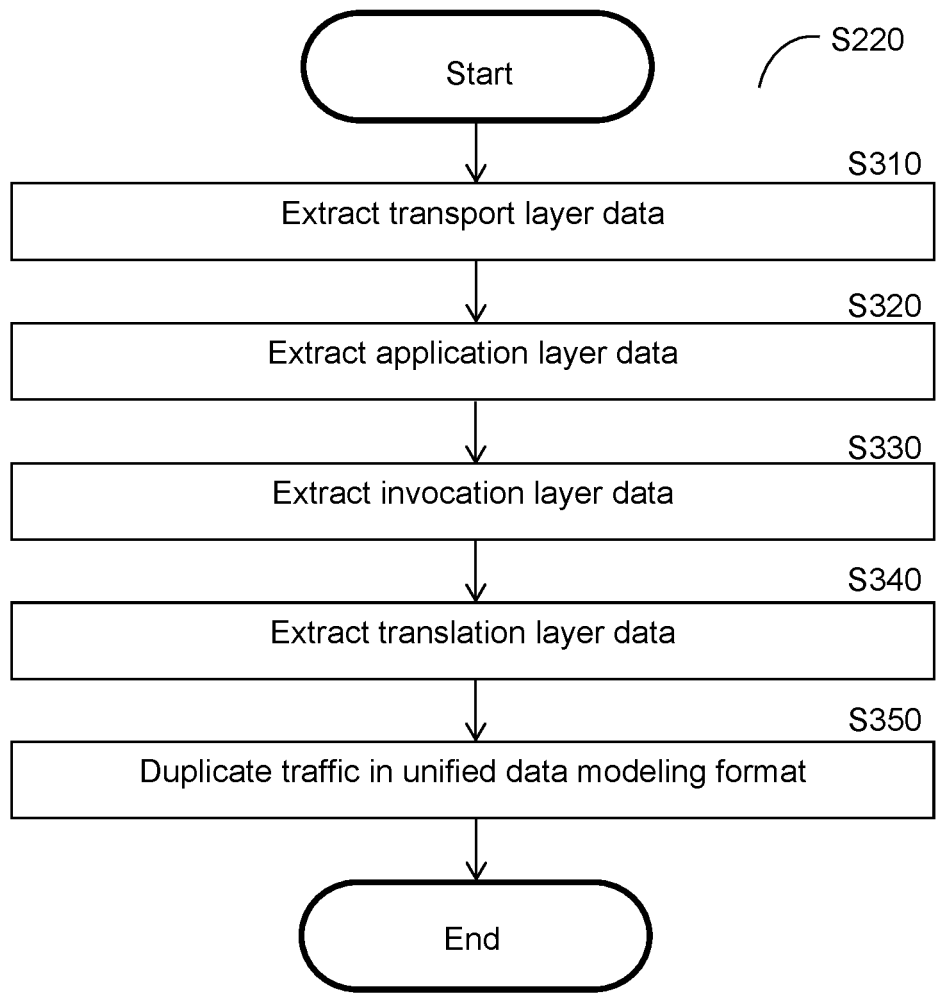
FIG. 3 is a flowchart illustrating a method for duplicating traffic according to an embodiment.

In an embodiment, the traffic is duplicated by peeling layers from the computing interface communications data and extracting specific portions of data from those layers, thereby providing the data needed to duplicate the traffic. The extraction of data from the layers may further include building one or more of the layers based on data extracted from lower layers. To this end, in a further embodiment, the traffic is duplicated as described with respect to FIG. 3. FIG. 3 is a flowchart S220 illustrating a method for duplicating traffic according to an embodiment.

At steps S310 through S340, data is extracted from various communication protocol layers used for communication between communications interfaces. For each layer, a respective set of rules for extracting data from that layer is applied to data communicated via that layer in order to extract data from that layer. Further, some of the layers may be built based on the data extracted from other layers. As a non-limiting example, when the layers include a transport layer, an application layer, an invocation layer, and a translation layer, data extracted from the transport layer may be used in building the application layer, data extracted from the application layer may be used in building the invocation layer, and data extracted from the invocation layer may be used in building the translation layer.

The set of rules for each layer defines fields which include data to be extracted regardless of the formatting used for those fields. In a further embodiment, the rules define fields such that data extracted from those fields includes protocol-specific data (i.e., data which is only used for a particular protocol). By only extracting such protocol agnostic data and duplicating the traffic based on that protocol agnostic data, the duplicated traffic itself is protocol agnostic and can be analyzed regardless of the protocol used for the original traffic.

To this end, the set of rules for each layer may include key words or other indicators that uniquely identify headers of particular fields such that, when those indicators are included in a field, it can be determined whether to extract data from that field. Alternatively or collectively, the set of rules for each layer may include applying a machine learning model trained to identify comparable data with respect to training data for that respective layer.

The data extracted for each layer may more specifically include data needed to build higher layers, metadata utilized for use in duplicating the traffic, both, and the like. The set of rules for each layer may further define which fields include data for building higher layers and which fields include metadata.

At S310, data is extracted from a transport layer. Extracting the data from the transport layer may include, but is not limited to, reconstructing communications according to the Transmission Control Protocol (TCP) or other transport layer protocol. To this end, S310 may further include segmenting traffic into different sessions and ordering the packets. The data is extracted from the ordered packets.

At S320, data is extracted from an application layer. Extracting the data from the application layer may include, but is not limited to, parsing Hypertext Transfer Protocol (HTTP) packets. To this end, S320 may further include splitting the packets into sessions, each session made of a request-response pair.

Figure 4:
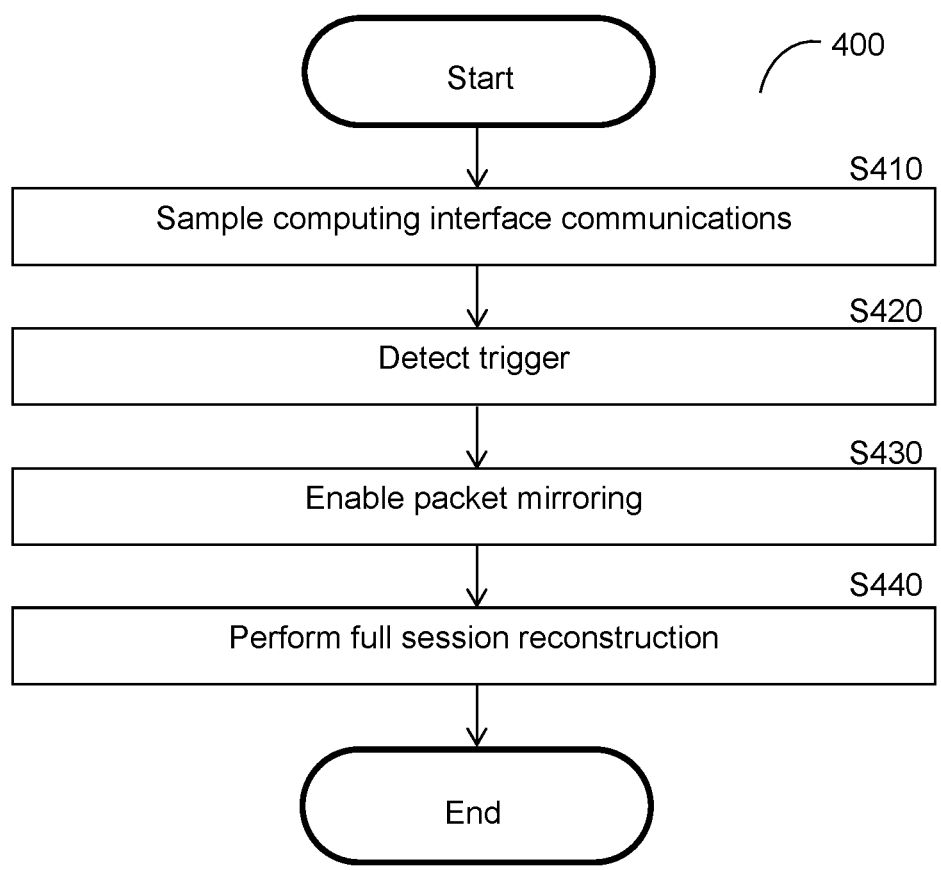
FIG. 4 is a flowchart illustrating a method for performing a full session reconstruction according to an embodiment.

In an embodiment where the system performing traffic duplication is not deployed inline between communications interfaces or otherwise when the system performing traffic duplication does not have access to the raw communications data (e.g., when the system is deployed out of line and receives incomplete communications data from an API gateway that is deployed inline such that the system does not have access to the complete set of request-response pairs), duplicating the traffic may further include performing a full session reconstruction as described further below with respect to FIG. 4. Such a full session reconstruction provides the request-response pairs needed for application layer data extraction.

At S330, data is extracted from an invocation layer. The invocation layer is a layer which includes invocation of functions or paths by a higher layer (e.g., the translation layer). In an embodiment, S330 includes identifying invocations of functions or paths.

Whether to identify invocations of functions or paths may be determined by identifying a type of communication framework (e.g., a type of remote procedure call or software architectural style) used for communications. To this end, the set of rules applied to the invocation layer may further include rules for identifying the type of communication framework and rules to be applied to communications according to different communication frameworks. Example communication frameworks may include, but are not limited to, Representational state transfer (REST), Simple Object Access Protocol (SOAP), gRPC Remote Procedure Calls (gRPC), and the like.

As a non-limiting example, for communications according to gRPC, the extracted data may include the name of a function that is invoked by the Protocol Buffers layer (i.e., the translation layer for gRPC). Such function name data may proceed to be used to build the Protocol Buffers layer. As another non-limiting example, for communications according to REST (which does not involve invoking functions), the extracted data may include the name of a path that is invoked by the translation layer.

At S340, data is extracted from a translation layer. The translation layer may be responsible for translating data by structuring the data into a particular format for storage or other subsequent use. Like for the invocation layer, the data may be stored in a protocol-specific format that varies depending on the communication framework being utilized and, therefore, the rules for extracting data from the translation data may include different sets of rules for different communication frameworks.

As a non-limiting example for the layers noted above, when a remote procedure call used for communications between two computing interfaces is gRPC, the transport layer is a TCP layer, the application layer is a HTTP 2 layer, the invocation layer is a gRPC layer, and the translation layer may be a Protocol Buffers Layer.

At S350, the traffic is duplicated based on the data extracted at each layer as described above with respect to S310 through S340. In an embodiment, the traffic is duplicated by converting the extracted data into a unified data modeling format. The unified data modeling format includes data related to the traffic which is protocol-agnostic, that is, the data is formatted such that subsequent use and processing of the data does not depend on the protocols which are used to communicate the data.

It should be noted that the extraction of data described above with respect to S310 through S340 includes extracting data from specific layers, but that the disclosed embodiments are not necessarily limited to these specific layers. In at least some other embodiments, data may be extracted from more or different layers than the layers mentioned above.

Returning to FIG. 2, at S230, based on the duplicated traffic, one or more anomalous behaviors are detected. The anomalous behaviors may be defined with respect to categories such as, for example, computing interface behaviors (e.g., behaviors of the computing interfaces transmitting data), user behavior vis-a-vis computing interfaces, data transmitted via computing interfaces, combinations thereof, and the like. To this end, S230 may include determining whether the duplicated traffic deviates from a baseline behavior with respect to one or more of these categories. The baselines may be defined, for example, using machine learning (e.g., by training a machine learning model based on training data including "normal" computing interface communications data). A different machine learning model may be trained for each category.

In an embodiment, the anomalous behaviors include miscorrelations within data transmitted via computing interfaces. The miscorrelations may be identified when there is a mismatch between an expected combination of data in a response or request and the actual combination of data in the response or request or an occurrence of an unexpected combination of data.

Such expected combinations of data may include correlated values in respective fields, which may be learned during training of the machine learning model. As a non-limiting example, a user identifier "0001" of a user Rachel may be associated with an access parameter "12345" such that, if another user identifier (e.g., a user identifier "0002" of a user Sophia) is transmitted in the same request or response as the access parameter "12345," a miscorrelation may be identified, and the transmission of the miscorrelated access parameter may be detected as an anomalous behavior.

An unexpected combination of data may be a combination of data in fields that has not previously been seen (i.e., is absent from historical requests or responses). As a non-limiting example, a request has fields "duration," "monthly_deposit," and "savings_plan." The request includes a change to the value for "savings_plan" (i.e., an attempt to change the type of savings plan) as compared to the most recent value for "savings_plan" for that user but does not include changes to the fields "duration" and "monthly deposit." Historical data from various users does not include such a combination of changes and lack thereof for these fields (or includes only a relatively small proportion of such a combination). As a result, the combination is determined to be unexpected and detected as anomalous behavior.

In another embodiment, the anomalous behaviors include anomalous values with respect to values of a total number of computing interface communications. Such anomalous values may include, but are not limited to, values which appear a relatively small number of times in a given field out of a total number of historical computing interface communications (e.g., a number of times that is less than or equal to a threshold proportion of the total number of communications), values having unusual properties for their respective fields (i.e., values having properties which appear a relatively small number of times in a given field out of a total number of historical computing interface communications), combinations thereof, and the like. The thresholds may be learned using machine learning or may be predetermined. As a non-limiting example for a value having an unusual property for a given field, a numerical value consisting of 9 digits for a given field which typically has 8 digit values would be unusual.

In yet another embodiment, the anomalous behavior may be detected as an invalid configuration of one of the computing interfaces. As a non-limiting example, based on the full session reconstruction, it is determined whether a computing interface of an internal service in a network environment (e.g., the internal service 120-1 of the network 110, FIG. 1) is using encryption or not. When one or more applicable policies for computing interfaces communicating in the network environment require that traffic be encrypted, a configuration of the computing interface is invalid when the computing interface is not encrypting traffic.

In this regard, it has been identified that requests sent via computing interfaces may include new data, i.e., data that is different from previously sent data or known data for a given user. However, such new data is not always anomalous and may simply reflect a change which is not otherwise anomalous. For example, a user may request to change the type of plan they are subscribed to. Such a change may be new in the sense that this user has never sent a request including the new type of plan but not be anomalous in the sense that the new type of plan itself is not uncommon among all requests. To this end, using historical data as described herein allows for determining whether such new data is anomalous as compared to that of communications between other computing interfaces. In the above example, a number or proportion of instances of the new value for the type of plan may be compared to a threshold and, if the number or proportion is above the threshold, the new value is determined not to be anomalous.

At optional S240, data related to the duplicated traffic may be generated and sent. The data generated at S240 may be sent to, for example, a user device (e.g., the admin device 150, FIG. 1). The data may be displayed, for example, via a dashboard or other graphical user interface.

In an embodiment, the data generated at S240 may include data representing the duplicated traffic, a full session reconstruction (i.e., including all requests and responses as well as data that uniquely identifies the computing interfaces sending those requests and responses), the detected anomalous behaviors, one or more insights, or a combination thereof.

In a further embodiment, the data representing the duplicated traffic may also include supplemental data. Such supplemental data may include, but is not limited to, statistics related to portions of the duplicated traffic, graphics illustrating such statistics, identifications of computing interfaces exposed in a network environment, identifications of rogue computing interfaces (i.e., computing interfaces which are either unknown or used by unknown services or systems) within the network environment, identifications of computing interfaces transmitting certain types of data (e.g., personally identifiable information), tracking data, combinations thereof, and the like. As a non-limiting example, such a statistic may be a number of users who accessed a particular type of service (e.g., a credit card provider service), a number of users who access a certain service (e.g., a particular credit card provider service), a number of instances of sending each type of data, numbers of Internet Protocol (IP) addresses requesting computing interface calls per geolocation, rate of computing interface calls, combinations thereof, and the like.

The tracking data may indicate all computing interfaces to which certain information is exposed. As a non-limiting example, a social security number sent from an external service to a first internal service and from the first internal service to a second internal service may be tracked such that the tracking data indicates the transmissions from the external service to the second internal service.

At S250, one or more policies are enforced based on the duplicated traffic. The policies may be, for example, defined by a user (e.g., a user of the admin device 150, FIG. 1). The policies may be enforced directly (i.e., by the same system performing the method of FIG. 2) or indirectly (e.g., based on instructions sent to a gateway or other system configured for policy enforcement).

In an embodiment, such policies require mitigating any detected anomalies. To this end, the policies may further define mitigation actions to be performed for different types of anomalous behaviors and S250 includes determining which mitigation actions to be performed as well as performing the determined mitigation actions. The mitigation actions may include, but are not limited to, terminating a communications session, shifting from duplicating traffic to inspecting intercepted traffic and only forwarding such intercepted traffic when it passes inspection, blocking an IP address of a requesting entity, combinations thereof, and the like.

In another embodiment, such policies may also include enforcing requirements related to computing interface communications. Such requirements may include, but are not limited to, configuration requirements for computing interfaces, validating contracts, validating authorization mechanisms, restrictions on modifying certain types of data (e.g., object properties), combinations thereof, and the like. The policies may further define triggers for sending alerts. Such triggers may be based on, but are not limited to, triggers for sending certain types of data (e.g., social security numbers).

FIG. 4 is an example flowchart 400 illustrating a method for performing a full session reconstruction according to an embodiment. In an embodiment, the method may be performed by the anomaly detector 140. In an example implementation, the method is performed when the anomaly detector 140 is deployed out of path of communications between services, for example, as shown in FIG. 1B.

At S410, communications related to traffic sent between computing interfaces is sampled. The sampling includes receiving a portion of the traffic.

At S420, a session reconstruction trigger is detected among the sampled traffic. The session reconstruction trigger may be, but is not limited to, a predetermined trigger value for a respective field, an unexpected value for a given field (e.g., as compared to historical data), communication with an unknown endpoint or computing interface, communication between endpoints which have not previously communicated, and the like. The predetermined trigger value may be, but is not limited to, a value of interest defined by a user. Such values of interest may include, but are not limited to, values which a user wishes to prevent unauthorized access to (e.g., social security numbers, as identified by a 9 digit value in certain fields), values which a user wishes to track (e.g., values indicating certain properties), both, and the like.

At S430, packet mirroring is enabled for the endpoints of the session. When enabled, the packet mirroring causes duplication of traffic which, in turn, may be utilized to reconstruct the entire session. In an embodiment, S330 may include sending an instruction to enable packet mirroring from an anomaly detector to a gateway, sensor, or other system configured to direct traffic between the endpoints. Alternatively, S330 may include initiating packet mirroring by the system performing the method of FIG. 2 (e.g., when such a system is an anomaly detector deployed in line between the endpoints as depicted in FIG. 1C).

At S440, a full session reconstruction is performed. In an embodiment, the full session reconstruction may include each request-response pair of the communications session (i.e., each request and the corresponding subsequent response) for requests and responses sent between computing interfaces of the endpoints.

In an embodiment, S440 further includes determining missing portions of the requests and responses of the communications session. In a further embodiment, the missing portions are determined based on correlations between field-value combinations of historical computing interface communications. As a non-limiting example, historical communications may consistently (e.g., above a threshold proportion of times) include the account type "premium" for a user identifier associated with a user Ann such that, when Ann's user identifier is included in a request or response, a missing portion may be determined to be the value "premium" for a field "account type."

As noted above, computing interface communications have the property that they tend to include repeated instances of particular field-value combinations such that typical field-value combinations can be learned over time. Accordingly, this property can be utilized to aid in full session reconstruction, thereby providing data which is not explicitly included in requests and responses (and therefore in mirrored packets of the communications session).

Figure 5:
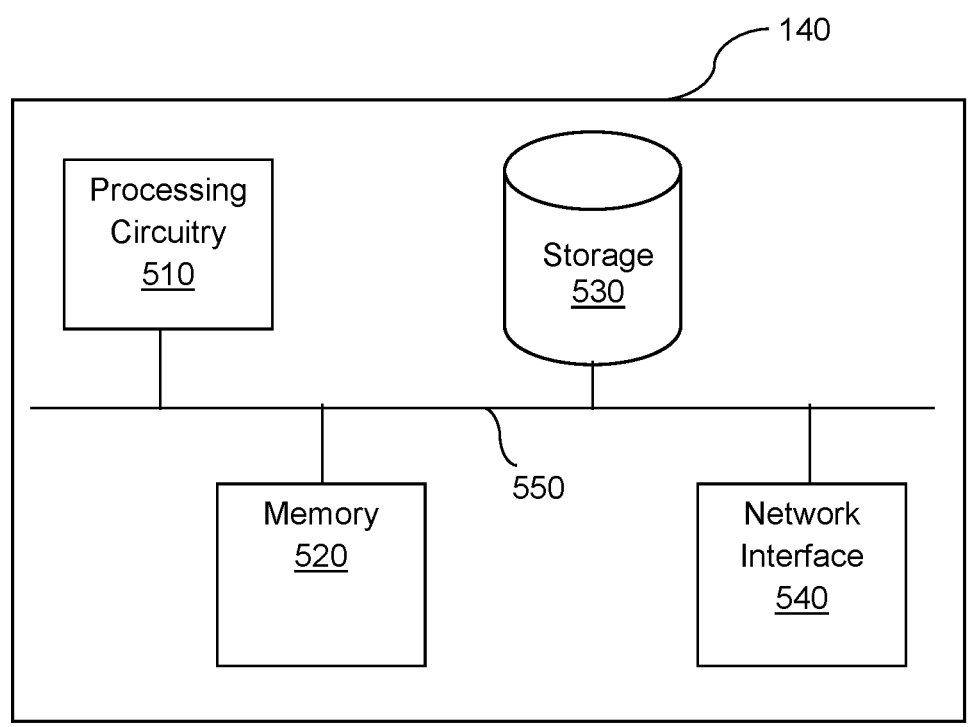
FIG. 5 is a schematic diagram of a channel anomaly detector according to an embodiment.

FIG. 5 is an example schematic diagram of an anomaly detector 140 according to an embodiment. The anomaly detector 140 includes a processing circuitry 510 coupled to a memory 520, a storage 530, and a network interface 540. In an embodiment, the components of the anomaly detector 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the anomaly detector 140 to communicate with, for example, the internal services 120, the external services 130, the admin device 150 combinations thereof, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identifying computing interface calls using communications protocols, comprising:
   extracting data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers;
   duplicating traffic for the communications session based on the extracted data to produce duplicated traffic, wherein duplicating the traffic includes converting the extracted data into a unified data modeling format that at least in part is protocol-agnostic such that at least some of the duplicated traffic is protocol-agnostic; and
   identifying at least one computing interface call based at least in part on the protocol-agnostic duplicated traffic.

2. The method of claim 1, further comprising:
   detecting an anomaly based on the identified at least one computing interface call.

3. The method of claim 2, further comprising:
   determining a configuration of the first computing interface and of the second computing interface based on the duplicated traffic, wherein the detected anomaly is an invalid configuration of the first interface or of the second interface.

4. The method of claim 2, wherein the detected anomaly is an anomalous value, wherein the anomalous value is anomalous with respect to a plurality of values of a plurality of historical computing interface communications, wherein instances of the anomalous value appear in the plurality of values below a threshold.

5. The method of claim 1, wherein the data is extracted from each of the plurality of communication protocol layers using a respective set of extraction rules for the layer, wherein the extraction rules for each layer include rules for identifying the data to be extracted from the layer.

6. The method of claim 1, wherein the plurality of layers includes a transport layer, an application layer, an invocation layer, and a translation layer.

7. The method of claim 1, wherein the method is performed by a system deployed out of path of the first computing interface and the second computing interface, wherein the communication between the first computing interface and the second computing interface includes a plurality of requests and a plurality of responses, wherein duplicating the traffic further comprises:
   enabling traffic mirroring between the first computing interface and the second computing interface in order to obtain a plurality of mirrored packets,
   determining at least one missing portion of the plurality of requests and the plurality of responses based on the plurality of mirrored packets; and
   performing a full session reconstruction based on the extracted data and the at least one missing portion.

8. The method of claim 7, wherein the at least one missing portion is determined based on the plurality of requests, the plurality of responses, and correlations between field-value combinations of historical computing interface communications.

9. The method of claim 8, wherein each of the plurality of requests and each of the plurality of responses further includes a plurality of fields and a plurality of values, further comprising:
   identifying a miscorrelation based on the plurality of fields and the plurality of values of each of the plurality of requests and each of the plurality of responses.

10. A non-transitory computer readable medium having stored thereon instructions for causing a processing circuitry to execute a process, the process comprising:

extracting data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers;

duplicating traffic for the communications session based on the extracted data to produce duplicated traffic, wherein duplicating the traffic includes converting the extracted data into a unified data modeling format that at least in part is protocol-agnostic such that at least some of the duplicated traffic is protocol-agnostic; and identifying at least one computing interface call based at least in part on the protocol-agnostic duplicated traffic.

11. A system for identifying computing interface calls using communications protocols, comprising:

a processing circuitry; and a memory, the memory containing instructions that, when executed by the processing circuitry, configure the system to:

extract data from a communications session involving communication between a first computing interface and a second computing interface, wherein the communication between the first computing interface and the second computing interface is implemented via a plurality of communication protocol layers, wherein extracting the data from the communications session further comprises building at least one layer of the plurality of communication protocol layers based on a portion of the data extracted from at least one other layer of the plurality of communication protocol layers;

duplicate traffic for the communications session based on the extracted data to produce duplicated traffic, wherein duplicating the traffic includes converting the extracted data into a unified data modeling format that at least in part is protocol-agnostic such that at least some of the duplicated traffic is protocol-agnostic; and identify at least one computing interface call based at least in part on the protocol-agnostic duplicated traffic.

12. The system of claim 11, wherein the system is further configured to:

detect an anomaly based on the identified at least one computing interface call.

13. The system of claim 12, wherein the system is further configured to:

determine a configuration of the first computing interface and of the second computing interface based on the duplicated traffic, wherein the detected anomaly is an invalid configuration of the first interface or of the second interface.

14. The system of claim 12, wherein the detected anomaly is an anomalous value, wherein the anomalous value is anomalous with respect to a plurality of values of a plurality of historical computing interface communications, wherein instances of the anomalous value appear in the plurality of values below a threshold.

15. The system of claim 11, wherein the data is extracted from each of the plurality of communication protocol layers using a respective set of extraction rules for the layer, wherein the extraction rules for each layer include rules for identifying the data to be extracted from the layer.

16. The system of claim 11, wherein the plurality of layers includes a transport layer, an application layer, an invocation layer, and a translation layer.

17. The system of claim 11, wherein the system is deployed out of path of the first computing interface and the second computing interface, wherein the communication between the first computing interface and the second computing interface includes a plurality of requests and a plurality of responses, wherein the system is further configured to:

enable traffic mirroring between the first computing interface and the second computing interface in order to obtain a plurality of mirrored packets, determine at least one missing portion of the plurality of requests and the plurality of responses based on the plurality of mirrored packets; and perform a full session reconstruction based on the extracted data and the at least one missing portion.

18. The system of claim 17, wherein the at least one missing portion is determined based on the plurality of requests, the plurality of responses, and correlations between field-value combinations of historical computing interface communications.

19. The system of claim 18, wherein each of the plurality of requests and each of the plurality of responses further includes a plurality of fields and a plurality of values, wherein the system is further configured to:

identify a miscorrelation based on the plurality of fields and the plurality of values of each of the plurality of requests and each of the plurality of responses.

\* \* \* \* \*